(No Model.)

D. ROBERGE, Jr.
HOOF EXPANDER AND FROG DEVELOPER FOR HORSES.

No. 446,471. Patented Feb. 17, 1891.

Witnesses:

Inventor:
David Roberge Jr.
per Lemuel W. Serrell atty

UNITED STATES PATENT OFFICE.

DAVID ROBERGE, JR., OF NEW YORK, N. Y.

HOOF-EXPANDER AND FROG-DEVELOPER FOR HORSES.

SPECIFICATION forming part of Letters Patent No. 446,471, dated February 17, 1891.

Application filed July 2, 1889. Serial No. 316,327. (No model.)

*To all whom it may concern:*

Be it known that I, DAVID ROBERGE, Jr., of the city and State of New York, have invented a Combined Hoof-Expander and Frog-Developer for Horses, of which the following is a specification.

In Letters Patent No. 239,550, granted to David Roberge, a spring is represented as adapted to be placed between the horse's shoe and the hoof for the purpose of expanding the rear portion of the hoof to prevent the contraction, cracks, and other defects in the horse's hoof.

My present invention relates to the combination, with the aforesaid hoof-expanding spring, of a shield for the frog, which acts also to spread or develop the frog and restore the hoof and frog to their natural shape and condition. The shield also acts to lessen concussion and to relieve the bearing-walls when the lamina is strained or diseased, and by restoring the parts to their natural condition unequal strain on the ligaments and joints is prevented.

Figure 1:
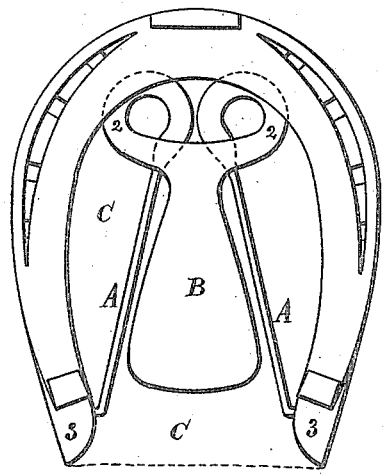
Figure 2:
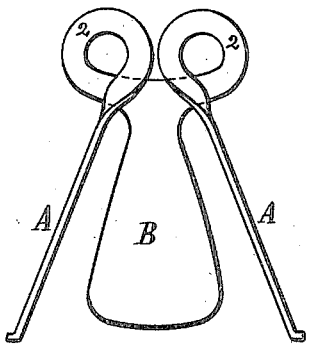

In the drawings, Figure 1 is an inverted plan showing the hoof-expander as applied in its proper position between the hoof and the shoe. Fig. 2 is a plan of the other side of the hoof-expander and frog-protector separately.

The spring-arms A A are to act between the rear portions of the hoof to spread the horny portion of the hoof apart to give the proper room for the frog, as set forth in the aforesaid patent. In practice I however find that in consequence of the hoof being raised off the ground by the shoe the frog is relieved from the pressure that ordinarily comes upon the same when the animal is in its natural condition without the addition of the iron shoe. For this reason the frog, instead of being expanded by the pressure due to the weight of the animal, becomes contracted or shriveled, and in so doing the horny portions at the rear of the hoof approach toward each other and the hoof becomes contracted, often rendering the animal lame and unserviceable. The springs A A largely remove the aforesaid difficulty by spreading the rear portion of the hoof asunder; but it is important to apply a certain amount of pressure to the frog in order to develop the same. With this object in view the frog-developer B is connected at one end to the springs A A and held in position by such springs between the inner rim of the shoe and the under side of the hoof, and this frog-developer B prevents the frog itself becoming bruised or injured by contact with the pavement and to cause a sufficient pressure upon the frog to spread the same and develop it laterally as the hoof is expanded. This frog-developer B may be of rubber or leather riveted at one or more places to the apex of the spring A; but I generally make the same of a metallic plate, preferably steel, as represented, such plate having arms to which the coils 2 of the springs A are fastened, and I find it advantageous to make these coils 2 in the manner represented, so that they lie flatwise between the shoe and the hoof, and the metal at the junction of the springs with the coils is twisted, so that the springs are free to expand between the rear portions 3 3 of the hoof C to spread the hoof gradually and restore the same to its natural condition.

I do not confine myself to the size or the material made use of in the frog-developer, as the same is preferably varied according to the condition of the hoof.

I claim as my invention—

1. The combination, with the spring hoof-expander, of a frog developer and protector connected with and receiving its support from the hoof-expander, substantially as set forth.

2. The combination, with the spring hoof-expander, of a frog-protector connected at one end to the spring hoof-expander and adapted to extend below the frog of the horse's hoof, substantially as set forth.

3. A spring hoof-expander and frog-developer formed of metal, the frog-developer being united with the coils at the ends of the springs forming the hoof-expander, substantially as set forth.

Signed by me this 26th day of June, 1889.

DAVID ROBERGE, JR.

Witnesses:
GEO. T. PINCKNEY,
WILLIAM G. MOTT.